US012804496B2

(12) United States Patent
Abdelnady Mahmoud et al.

(10) Patent No.: US 12,804,496 B2
(45) Date of Patent: Nov. 17, 2026

(54) INTELLIGENT SEAMLESS HANDOVER IN CELLULAR NETWORKS

(71) Applicant: Dell Products L.P., Round Rock, TX (US)

(72) Inventors: Hala Hamdy Abdelnady Mahmoud, Cairo (EG); Medhat Khalifa, Giza (EG)

(73) Assignee: DELL PRODUCTS L.P., Round Rock, TX (US)

( * ) Notice: Subject to any disclaimer, the term of this patent is extended or adjusted under 35 U.S.C. 154(b) by 246 days.

(21) Appl. No.: 18/794,269

(22) Filed: Aug. 5, 2024

(65) Prior Publication Data

US 2026/0040175 A1 Feb. 5, 2026

(51) Int. Cl.

*H04W 36/32* (2009.01)
*H04B 17/318* (2015.01)
*H04W 36/00* (2009.01)

(52) U.S. Cl.

CPC .......... *H04W 36/13* (2023.05); *H04B 17/328* (2023.05); *H04W 36/32* (2013.01)

(58) Field of Classification Search

CPC ..... H04W 36/13; H04W 36/32; H04B 17/328
See application file for complete search history.

(56) References Cited

U.S. PATENT DOCUMENTS

| | | | | |
|---|---|---|---|---|
| 11,109,283 | B1 * | 8/2021 | Kulkarni | H04W 24/02 |
| 2013/0084870 | A1 * | 4/2013 | Nylander | H04W 36/0061 455/436 |
| 2024/0119365 | A1 * | 4/2024 | Khatibi | H04W 36/00837 |

FOREIGN PATENT DOCUMENTS

| | | | | |
|---|---|---|---|---|
| EP | 4346279 A1 | * | 4/2024 | H04W 36/00833 |
| GB | 2628551 A | * | 10/2024 | H04L 41/16 |

OTHER PUBLICATIONS

Rivera et al. (QoS-Aware Load Balancing in Wireless Networks using Clipped Double Q-Learning, May 19, 2024).*
Iturria-Rivera, et al. "QoS-Aware Load Balancing in Wireless Networks using Clipped Double Q-Learning" 2021 IEEE 18th International Conference on Mobile Ad Hoc and Smart Systems (MASS), 2021, 7 pages.

* cited by examiner

*Primary Examiner* — Lakeram Jangbahadur
(74) *Attorney, Agent, or Firm* — Amin, Turocy & Watson, LLP

(57) ABSTRACT

Intelligent seamless handover in cellular networks (e.g., using a computerized tool), is enabled. For example, a system can comprise at least one processor, and at least one memory that stores executable instructions that, when executed by the at least one processor, facilitate performance of operations. The operations can comprise, based on serving cell connection data, neighbor cell connection data, and user equipment data, determining, using a time-series machine learning model trained using past serving cell connection data, past neighbor cell connection data, and past user equipment data, a predicted connection status for the user equipment, and based on the predicted connection status, serving cell load data representative of a first load on the serving cell, and neighbor cell load data representative of a second load on the neighbor cell, controlling a handover of the user equipment between the serving cell and the neighbor cell.

20 Claims, 12 Drawing Sheets

400

| Time-stamp | Serving cell | | | | Neighbor cell | | UE velocity | | UE location | Cell location |
|---|---|---|---|---|---|---|---|---|---|---|
| | RSSI | RSRP | RSRQ | SINR | RSRP | RSRQ | SPEED | DIRECTION | | |
| 1 | | | | | | | | | | |
| 2 | | | | | | | | | | |
| 3 | | | | | | | | | | |
| .. | | | | | | | | | | |
| T+1 | | | | | | | | | | |
| T+2 | | | | | | | | | | |
| .. | | | | | | | | | | |
| .. | | | | | | | | | | |
| .. | | | | | | | | | | |

input (rows 1, 2, 3, ..)

output (row T+1)

FIG. 4

INTELLIGENT SEAMLESS HANDOVER IN CELLULAR NETWORKS

BACKGROUND

In cellular networks, the issue of delay during handover processes poses a critical challenge, particularly for high-speed user equipment (UE). These delays can result in a cascade of detrimental effects, such as dropped connections and interrupted sessions, and can significantly impact user experience and network performance.

Delayed handover processes often lead to dropped connections, causing frustration and inconvenience for users of a corresponding cellular network. In use cases in which seamless connectivity is crucial, such as with voice calls or online gaming, even brief interruptions can significantly degrade user satisfaction and perception of service quality.

The above-described background relating to handover processes is merely intended to provide a contextual overview of some current issues and is not intended to be exhaustive. Other contextual information may become further apparent upon review of the following detailed description.

BRIEF DESCRIPTION OF DRAWINGS

FIG. 4 is a diagram of example LSTM model training dataset collection in accordance with one or more example embodiments described herein.

DETAILED DESCRIPTION

Figure 1:
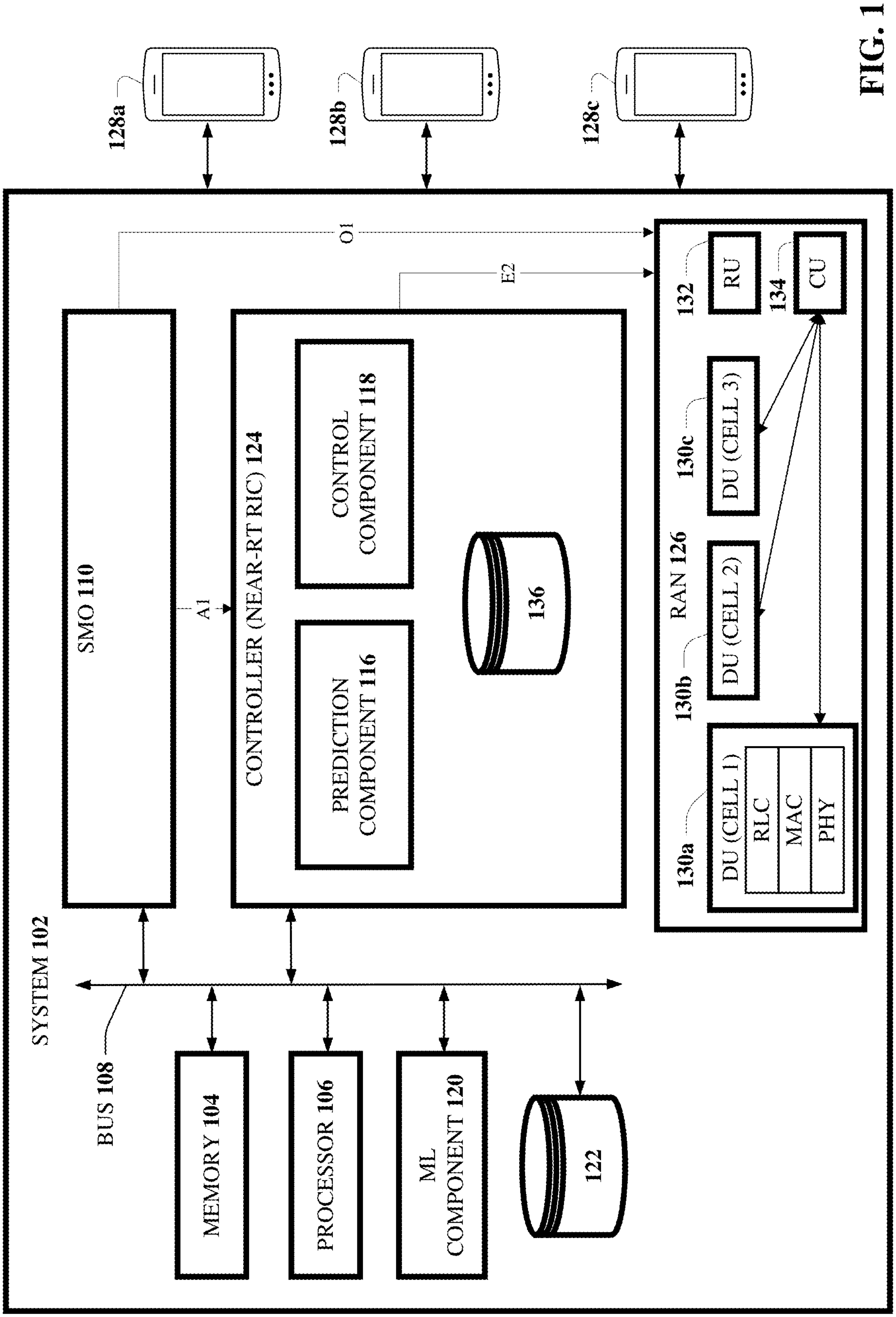
FIG. 1 is a block diagram of an exemplary system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, brief interruptions in cellular service can significantly degrade user satisfaction and perception of service quality.

The repercussions of handover delays extend beyond mere connection drops, thus impacting the overall quality of service (QOS) experienced by users. Cellular communications (e.g., connections) that rely on consistent and uninterrupted data transmission, such as video streaming and real-time communication, suffer from degraded performance when handover processes fail to swiftly transition a UE between cells. This degradation manifests as buffering, pixelation, or audio/video synchronization issues, which impairs user experience and diminishes the perceived value of the service.

Handover delays exacerbate latency and contribute to a higher block error rate (BLER) in data transmission. For high-speed (e.g., rapidly moving) UE, such as UE in vehicles, which often traverse cell boundaries rapidly, prolonged handover procedures introduce additional latency, thus impairing responsiveness and real-time data delivery. Moreover, the increased BLER resulting from inefficient handovers can lead to packet loss, retransmissions, and ultimately, degraded network reliability and throughput.

In this regard, handover processes can be improved in various ways, and various example embodiments are described herein to this end and/or other ends. The disclosed subject matter relates to telecommunications systems and, more particularly, to intelligent seamless handover in cellular networks.

According to an example embodiment, a system can comprise at least one processor, and at least one memory that stores executable instructions that, when executed by the at least one processor, facilitate performance of operations, comprising, based on serving cell connection data applicable to a serving cell, neighbor cell connection data applicable to a neighbor cell that neighbors the serving cell, and user equipment data applicable to a user equipment communicatively connected to the serving cell, determining, using a time-series machine learning model trained using past serving cell connection data applicable to past service cell connections with the serving cell, past neighbor cell connection data applicable to past neighbor cell connections with the neighbor cell, and past user equipment data applicable to user equipment previously connected to the serving cell, a predicted connection status for the user equipment, and based on the predicted connection status, serving cell load data representative of a first load on the serving cell, and neighbor cell load data representative of a second load on the neighbor cell, controlling a handover of the user equipment between the serving cell and the neighbor cell.

In one or more example embodiments, the user equipment data can comprise a velocity of the user equipment, a direction of travel of the user equipment, and a location of the user equipment.

In one or more example embodiments, the controlling of the handover can comprise facilitating the handover from the serving cell to the neighbor cell.

In one or more example embodiments, the controlling of the handover can comprise retaining the communicative connection between the serving cell and the user equipment.

In one or more example embodiments, the serving cell connection data can comprise at least one of: a received signal strength indicator applicable to the serving cell, a signal received power applicable to the serving cell, a signal received quality applicable to the serving cell, or a signal to interference plus noise ratio applicable to the serving cell.

In one or more example embodiments, the neighbor cell connection data can comprise at least one of: a first reference signal received power applicable to the neighbor cell or a second reference signal received quality applicable to the neighbor cell.

In one or more example embodiments, the controlling of the handover of the user equipment between the serving cell and the neighbor cell can be determined to result in satisfying a function with respect to a quality-of-service metric applicable to the user equipment, and the quality-of-service metric can comprise at least one of a throughput metric corresponding to a throughput applicable to the user equipment, a latency metric corresponding to a latency applicable to the user equipment, or a connection drop status metric corresponding to a connection drop status applicable to the user equipment.

In one or more example embodiments, the controlling of the handover of the user equipment between the serving cell and the neighbor cell can be determined to result in maximizing a quality-of-service metric applicable to the user equipment.

In one or more example embodiments, the time-series machine learning model can comprise a long short-term memory model.

In one or more example embodiments, the controlling of the handover of the user equipment between the serving cell and the neighbor cell can be performed using a machine learning model trained based on reinforcement learning. In this regard, the reinforcement learning can comprise utilization of weighting coefficients applicable to at least one of a handover action associated with the user equipment, a throughput associated with the user equipment, or a latency associated with the user equipment.

In another example embodiment, a non-transitory machine-readable medium can comprise executable instructions that, when executed by a processor, facilitate performance of operations, comprising, based on first network node connection data corresponding to a first network node of a cellular network, second network node connection data corresponding to a second network node of the cellular network, and user equipment data corresponding to a user equipment communicatively connected to the first network node, determining, using a time-series machine learning model trained using past network connection data corresponding to past network connections of network nodes of the cellular network and past user equipment data corresponding to past user equipment that were connected to at least one of the first network node or the second network node of the cellular network, a predicted connection status for the user equipment, and based on the predicted connection status, first network node load data corresponding to a first load measured for the first network node, and second network node load data corresponding to a second load measured for the second network node, controlling a handover of the user equipment from being served by the first network node to being served by the second network node or controlling the handover of the user equipment from being served by the second network node to being served by the first network node.

In one or more example embodiments, the determining of the predicted connection status for the user equipment can be further based on third network node connection data corresponding to a third network node of the cellular network, and the controlling of the handover of the user equipment can be further controlled, based on third network node load data, between the first network node, the second network node, and the third network node.

In one or more example embodiments, the user equipment data can comprise at least one of: a velocity of the user equipment, a direction of travel of the user equipment, or a location of the user equipment.

In one or more example embodiments, the first network node connection data can comprise at least one of: a received signal strength indicator corresponding to the first network node, a signal received power corresponding to the first network node, a signal received quality corresponding to the first network node, or a signal to interference plus noise ratio corresponding to the first network node.

In one or more example embodiments, the second network node connection data can comprise at least one of: a first reference signal received power corresponding to the second network node or a second reference signal received quality corresponding to the second network node.

According to yet another example embodiment, a method can comprise, based on serving cell connection data applicable to serving cell equipment, neighbor cell connection data applicable to neighbor cell equipment that neighbors the serving cell equipment, and user device data applicable to a user device communicatively connected to the serving cell equipment, determining, by network equipment comprising at least one processor, using a time-series machine learning model trained using past serving cell connection data, past neighbor cell connection data, and past user device data, a predicted connection status for the user device, and based on the predicted connection status, serving cell load data, and neighbor cell load data, controlling, by the network equipment, a transfer of the user device from being connected via the serving cell equipment to being connected to the neighbor cell equipment, or the transfer of the user device from being connected via the neighbor cell equipment to being connected to the serving cell equipment.

In one or more example embodiments, the controlling of the transfer of the user device between the serving cell equipment and the neighbor cell equipment can be determined to maximize a quality-of-service metric applicable to the user device.

In one or more example embodiments, the controlling of the transfer of the user device between the serving cell equipment and the neighbor cell equipment can be determined to satisfy a defined function with respect to a quality-of-service metric applicable to the user device, and the quality-of-service metric can comprise a throughput metric corresponding to a throughput applicable to the user device, a latency metric corresponding to a latency applicable to the user device, or a connection drop status metric corresponding to a connection drop status applicable to the user device.

In one or more example embodiments, the controlling of the transfer of the user device between the serving cell equipment and the neighbor cell equipment can be performed using an output from a reinforcement learning process.

It should be appreciated that additional manifestations, configurations, implementations, protocols, etc. can be utilized in connection with the following components described herein or different/additional components as would be appreciated by one skilled in the art.

Example embodiments herein address above-described handover problems, for instance, using a prediction component (e.g., a measurement prediction component) (e.g., an xApp), and a control component (e.g., an xApp). The prediction component and the control component address the challenge of delay in handovers, for instance, by integrating the xApps within the network (e.g., cellular network) architecture (e.g., within a controller (a near real time radio intelligent controller)).

The prediction component can utilize a time-series machine learning (ML) model trained on historical UE measurements to forecast future metrics for both the serving cell and neighboring cells (e.g., network nodes or cell equipment). The inputs to this model can comprise, for instance, UE measurements of the serving cell, measurements of neighboring cells, UE velocity, and/or UE location. By analyzing this data, the model can be utilized (e.g., via the prediction component and/or control component) to generate predictions for the next timestamp's measurements, thus enabling proactive decision-making via a system herein.

In various example embodiments, the control component can operate as an autonomous decision-making engine that receives outputs from the above-described prediction component. Based on these predictions, UE behavior, and/or cell load, the control component can make informed decisions regarding handover actions for each UE. By incorporating real-time predictions of network conditions, the control component can optimize handover decisions, thus ensuring seamless connectivity while maximizing UE quality of service.

Example embodiments herein enable predictive analytics. In this regard, the integration of a time-series ML model within the prediction component enables near real-time forecasting of network metrics, thus enabling proactive adaptation to changing cellular conditions.

Example embodiments herein enable dynamic handover decision making. In this regard, the control component herein can utilize reinforcement learning (RL) and/or an RL model to make dynamic handover decisions, for instance, based on the predicted measurements and/or UE behavior. This approach ensures, for instance, that handover actions are aligned with current network conditions and user mobility patterns, thus minimizing delays and disruptions.

Example embodiments herein enable incorporation of UE velocity and location, which enhances handover decisions, for instance, by not only considering signal metrics, but also the mobile device's (e.g., UE's) movement and position.

By leveraging near real-time radio intelligent controller (RIC) capabilities, example embodiments herein seamlessly integrate predictive analytics into the network architecture, thus enabling efficient communication and decision-making between network elements.

Example embodiments herein enable an enhanced user experience. For instance, through proactive handover optimization, various example embodiments via systems herein improve overall user experience by reducing handover delays, minimizing dropped calls, and/or ensuring uninterrupted data sessions.

Turning now to FIG. 1, there is illustrated an example, non-limiting system 102 in accordance with one or more example embodiments herein. System 102 can comprise a computerized tool, which can be configured to perform various operations relating to intelligent seamless handover in cellular networks. The system 102 can comprise one or more of a variety of components, such as memory 104, processor 106, bus 108, SMO 110, prediction component 116, control component 118, ML component 120, model(s) 122, controller 124 (e.g., a near-RT RIC), radio access network (RAN) 126 (e.g., an E2 node), distributed units (DUs) 130 (e.g., DU 130*a*, DU 130*b*, DU 130*c*, etc.), radio unit (RU) 132, central unit (CU) 134, and/or database 136. In various example embodiments, the system 102 can be communicatively coupled to, or can further comprise, one or more UE 128 (e.g., UE 128*a*, UE 128*b*, UE 128*c*. etc.) In various example embodiments, one or more of the memory 104, processor 106, bus 108, SMO 110, prediction component 116, control component 118, ML component 120, model(s) 122, controller 124, RAN 126 (e.g., an E2 node), one or more of UE 128, one or more of DU 130, RU 132, CU 134, and/or database 136 can be communicatively or operably coupled (e.g., over a bus or wireless network) to one another to perform one or more functions of the system 102.

In various example embodiments, the SMO 110 can comprise a service management and orchestration layer that controls, for instance, configuration and automation aspects of RIC and/or RAN 126 elements. In this regard, the SMO 110 can onboard xApps and/or rApps onto RIC component(s). In various example embodiments, the database 136 can store key performance indicators (KPIs) collected from E2 nodes herein. In various example embodiments, the database 136 can further store subscription details (e.g., requested KPIs, accepted/failed requests, etc.)

In various example embodiments, the prediction component 116 can, based on serving cell connection data applicable to a serving cell (e.g., a network node or cell equipment) (e.g., cell 602 or DU 130*a*), neighbor cell connection data applicable to a neighbor cell (e.g., a network node or cell equipment) (e.g., a cell 606 or DU 130*b*) that neighbors the serving cell (e.g., cell 602), and user equipment data applicable to a user equipment (e.g., UE 604 or UE 128)) communicatively connected to the serving cell (e.g., cell 602), determine, using a time-series machine learning model (e.g., of the models 122) trained (e.g., via the ML component 120) using past serving cell connection data applicable to past service cell connections with the serving cell (e.g., cell 602), past neighbor cell connection data applicable to past neighbor cell connections with the neighbor cell (e.g., cell 606), and past user equipment data applicable to user equipment previously connected to the serving cell (e.g., cell 602) (e.g., prior connection of the UE 604 and/or other previously connected UEs other than the UE 604), a predicted connection status for the user equipment (e.g., UE 604). In this regard, the time-series machine learning model can be trained (e.g., via the ML component 120) using past network connection data corresponding to past network connections of network nodes of a corresponding cellular network and past user equipment data corresponding to past user equipment (e.g., other than the UE 604 and/or prior connections of the UE 604) that were connected to at least one of the serving cell (e.g., of the cellular network) or the neighbor cell (e.g., of the cellular network), a predicted connection status for the UE (e.g., UE 604). Such a predicted connection status can comprise, for instance, whether the connection between the UE (e.g., UE 604) and the serving cell (e.g., cell 602) is predicted to be dropped (e.g., or significantly degraded) at a future point in time, or whether the connection between the UE (e.g., UE 604) and the serving cell is predicted to be maintained (e.g., above a defined threshold quality level) (e.g., for a defined amount of time).

In various example embodiments, the above-described user equipment data can comprise, for instance, a velocity of the user equipment (e.g., UE 604), a direction of travel of the user equipment (e.g., UE 604), and/or a location of the user equipment (e.g., UE 604). In this regard, the prediction component 116 can utilize the velocity of the user equipment (e.g., UE 604), the direction of travel of the user equipment (e.g., UE 604), and/or the location of the user equipment (e.g., UE 604) in order to determine the predicted connection status of the user equipment (e.g., UE 604).

In various example embodiments, the above-described serving cell connection data can comprise, for instance, at least one of: a received signal strength indicator applicable to the serving cell (e.g., cell 602), a signal received power applicable to the serving cell (e.g., cell 602), a signal received quality applicable to the serving cell (e.g., cell 602), or a signal to interference plus noise ratio applicable to the serving cell (e.g., cell 602). In this regard, the prediction component 116 can further utilize the received signal strength indicator applicable to the serving cell (e.g., cell 602), the signal received power applicable to the serving cell (e.g., cell 602), the signal received quality applicable to the serving cell (e.g., cell 602), and/or the signal to interference plus noise ratio applicable to the serving cell (e.g., cell 602) in order to determine the predicted connection status of the user equipment (e.g., UE 604).

In various example embodiments, the above-described time-series machine learning model can comprise an LSTM model.

Figure 2:
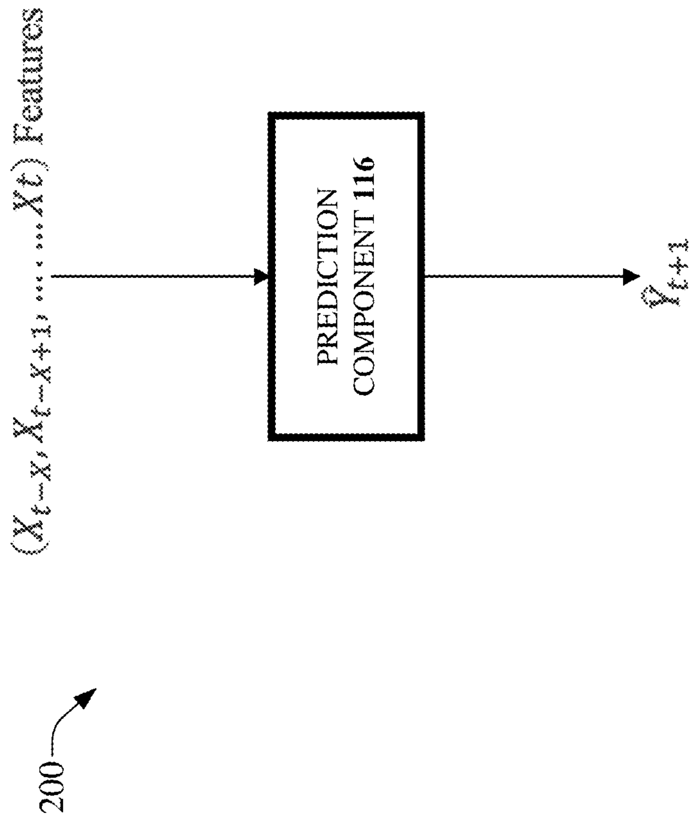
FIG. 2 is a diagram of exemplary measurement prediction in accordance with one or more example embodiments described herein.

FIG. 2 is a diagram of exemplary measurement prediction 200 in accordance with one or more example embodiments described herein. In various example embodiments, the prediction component 116 can predict the next timestamp metrics for the serving cell (e.g., cell 602) and neighboring cells (e.g., cell 606 and/or cell 702). In various example embodiments, the prediction component 116 can utilize the following input metrics:

- UE (e.g., UE 604) measurement of the serving cell (e.g., cell 602):
  - Received Signal Strength Indicator (RSSI);
  - Reference Signal Received Power (RSRP);
  - Reference Signal Received Quality (RSRQ); and/or
  - Signal-to-Interference-plus-Noise Ratio (SINR).
- Neighbor cell (e.g., cell 606 and/or cell 702) measurements:
  - RSRP of neighboring cells; and/or
  - RSRQ of neighboring cells.
- UE (e.g., UE 604) velocity:
  - Speed of the UE; and/or
  - Direction of UE movement.
- UE (e.g., UE 604) location:
  - Geographical coordinates of the UE.
- Cell (e.g., cell 602, cell 606, cell 702, or another suitable cell) location:
  - Geographical coordinates of the base station for serving and neighbor cells.

In various example embodiments, the prediction component 116 can utilize an LSTM model, which can facilitate sequential data and be configured to learn temporal patterns from historical measurements. The LSTM model can be utilized to predict (e.g., via the system 102) the next timestamp's metrics for both the serving cell (e.g., cell 602) and neighboring cells (e.g., cell 606 and/or cell 702) based on the input data provided.

$$\hat{Y}_{t+1} = f(X_{t-X}, X_{t-X+1}, Xt) \quad \text{(Equation 1)}$$

where

- $\hat{Y}_{t+1}$ are predicted measurements for serving cell and neighbors at time t+1;
- $f$ is a predictive function of the time-series model; and
- ($X_{t-X}$, $X_{t-X+1}$, . . . Xt) are input features with historical measurements up to time t.

The LSTM model herein can be configured to, for instance, learn (e.g., via the system 102) from past X timeframes (e.g., points in time) of measurements to capture temporal dependencies and predict the next measurement values (e.g., future points in time).

In various example embodiments, the prediction component 116 can generate for instance, via the LSTM model, an output comprising the predicted measurements for the serving cell and neighboring cells at time t+1. These predicted metrics can include, for instance, parameters such as RSSI, RSRP, RSRQ, SINR, or any other suitable network performance indicators.

Figure 3:
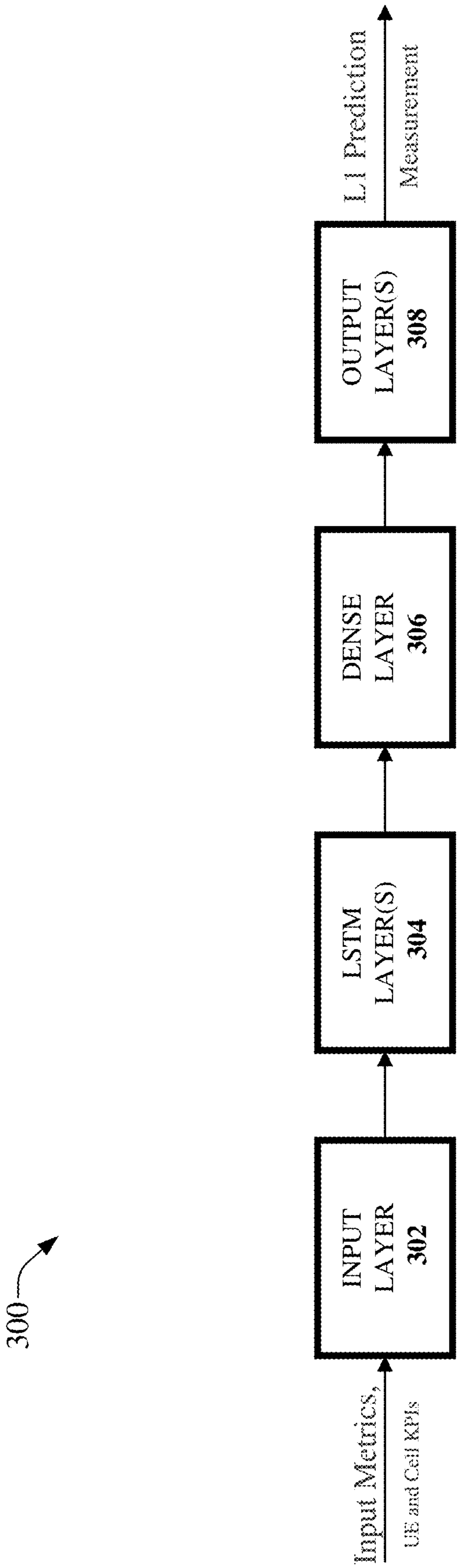
FIG. 3 is a diagram of an example Long Short-Term Memory (LSTM) model in accordance with one or more example embodiments described herein.

FIG. 3 is a diagram of an example LSTM model 300 in accordance with one or more example embodiments described herein. In various example embodiments, the LSTM model can comprise a multivariate timeseries model. The LSTM can comprise a type of recurrent neural network (RNN) designed to handle sequential data, catch temporal difference, and capture long-term dependencies. Utilizing a multivariate LSTM enables (e.g., via the system 102) having multiple input features and predict multiple outputs. In a nonlimiting example, the LSTM can comprise the following layers:

- Input layer 302 with multiple neurons-one for each input feature;
- LSTM layers 304 to capture temporal dependencies;
- Dense layers 306 for predicting output features for serving cell and neighbor cells; and
- Output layer(s) 308:
  - One neuron predicting serving cell measurements; and
  - Other layer predicting neighbor cells measurements.

FIG. 4 is a diagram of example LSTM model training dataset collection in accordance with one or more example embodiments described herein. To train (e.g., via the ML component 120) the LSTM model for predicting the next time of UE L1 measurement, the system 102 (e.g., via the ML component 120) can organize the training dataset in a supervised learning format where:

- ($X_{t-X}$, $X_{t-X+1}$, . . . Xt) are input features with historical measurements up to time t; and
- $\hat{Y}_{t+1}$ are predicted measurements for serving cell and neighbors at t+1.

The ML component 120 can construct, for instance, training data herein from real-world scenarios or simulators, in which serving cell and neighbor cell measurements are collected and stored in a tabular format over a defined period of time. For the data preparation, the ML component 120 can define, for instance, the input features as the consequent T timestamp measurements recorded in the table 400 and the labeled output as the timestamp T+1 measurement. This process can be repeated, for instance, throughout the entire collected dataset (e.g., the training dataset).

In various example embodiments, the control component 118 can, based on the predicted connection status, serving cell load data representative of a first load on the serving cell, and/or neighbor cell load data representative of a second load on the neighbor cell, control a handover of the user equipment (e.g., UE 604) between the serving cell (e.g., cell 602) and the neighbor cell (e.g., cell 606). In various example embodiments, the controlling (e.g., via the control component 118) of the handover (e.g., between a serving cell and a neighbor cell) can comprise facilitating (e.g., via the control component 118) the handover from the serving cell (e.g., cell 602) to the neighbor cell (e.g., cell 606 or cell 702). In further embodiments, the controlling (e.g., via the control component 118) of the handover can comprise retaining the communicative connection between the serving cell (e.g., cell 602) and the user equipment (e.g., UE 604).

In various example embodiments, the neighbor cell connection data can comprise at least one of: a first reference signal received power applicable to the neighbor cell (e.g., cell 606 or cell 702) or a second reference signal received quality applicable to the neighbor cell (e.g., cell 606 or cell 702).

In various example embodiments, the controlling (e.g., via the control component 118) of the handover of the user equipment (e.g., UE 604) between the serving cell (e.g., cell 602) and the neighbor cell (e.g., cell 606) can be determined to result in satisfying a function with respect to a quality-of-service metric applicable to the user equipment (e.g., UE 604). In this regard, wherein the quality-of-service metric can comprise at least one of a throughput metric corresponding to a throughput applicable to the user equipment (e.g., UE 604), a latency metric corresponding to a latency applicable to the user equipment (e.g., UE 604), or a connection drop status metric corresponding to a connection drop status applicable to the user equipment (e.g., UE 604). Thus, the control component 118 can be configured to maintain a defined threshold throughput, a defined threshold latency, and/or a defined connection drop status when determining whether to initiate a handover of the UE 604 from the serving cell (e.g., cell 602) to another cell (e.g., a neighbor cell) in the corresponding cellular network. In various example embodiments, the controlling (e.g., via the control component 118) of the handover of the user equipment (e.g., UE 604) between the serving cell (e.g., cell 602) and the neighbor cell (e.g., cell 606) can be determined to result in maximizing a quality-of-service metric applicable to the user equipment. Such a QoS metric can comprise, for instance, one or more of latency, jitter, packet loss, throughput, RSSI, SINR, bandwidth, cell setup success rate (CSSR), call drop rate (CDR), handover success rate, availability, round trip time (RTT), network coverage, error rate, or another suitable QoS metric.

In various example embodiments, the controlling (e.g., via the control component 118) of the handover of the user equipment (e.g., UE 604) between the serving cell (e.g., cell 602) and the neighbor cell (e.g., cell 606) can be performed using a machine learning model (e.g., of the models 122) trained (e.g., via the ML component 120) based on RL. In this regard, the RL can comprise, for instance, utilization (e.g., via the control component 118) of defined weighting coefficients applicable to at least one of a handover action associated with the user equipment (e.g., UE 604), a throughput associated with the user equipment (e.g., UE 604), or a latency associated with the user equipment (e.g., UE 604).

In various example embodiments, the determining (e.g., via the prediction component 116) of the predicted connection status for the user equipment (e.g., UE 604) can be further based on third network node connection data corresponding to a third network node (e.g., cell 702) of the corresponding cellular network. In this regard, the controlling (e.g., via the control component 118) of the handover of the user equipment (e.g., UE 604) can be further controlled, based on third network node load data, between the first network node (e.g., cell 602), the second network node (e.g., cell 606), and the third network node (e.g., cell 702). Further in this regard, the control component 118 can be configured to select the network node (e.g., network cell) from among the first network node (e.g., cell 602), second network node (e.g., cell 606), and third network node (e.g., cell 702) that is determined (e.g., via the control component 118) to maximize a quality-of-service metric applicable to the user equipment. Such a QoS metric can comprise one or more of latency, jitter, packet loss, throughput, RSSI, SINR, bandwidth, CSSR, CDR, handover success rate, availability, RTT, network coverage, error rate, or another suitable QoS metric. If the network node is determined (e.g., via the control component 118 and prediction component 116) to comprise the serving cell, then a handover action is not taken. If, on the other hand, the network node is determined (e.g., via the control component 118 and prediction component 116) to comprise a neighbor cell (e.g., cell 606 or cell 702), then a handover action is taken and the UE (e.g., UE 604) is transferred from the serving cell (e.g., cell 602) to the neighbor cell (e.g., cell 606 or cell 702).

Figure 5:
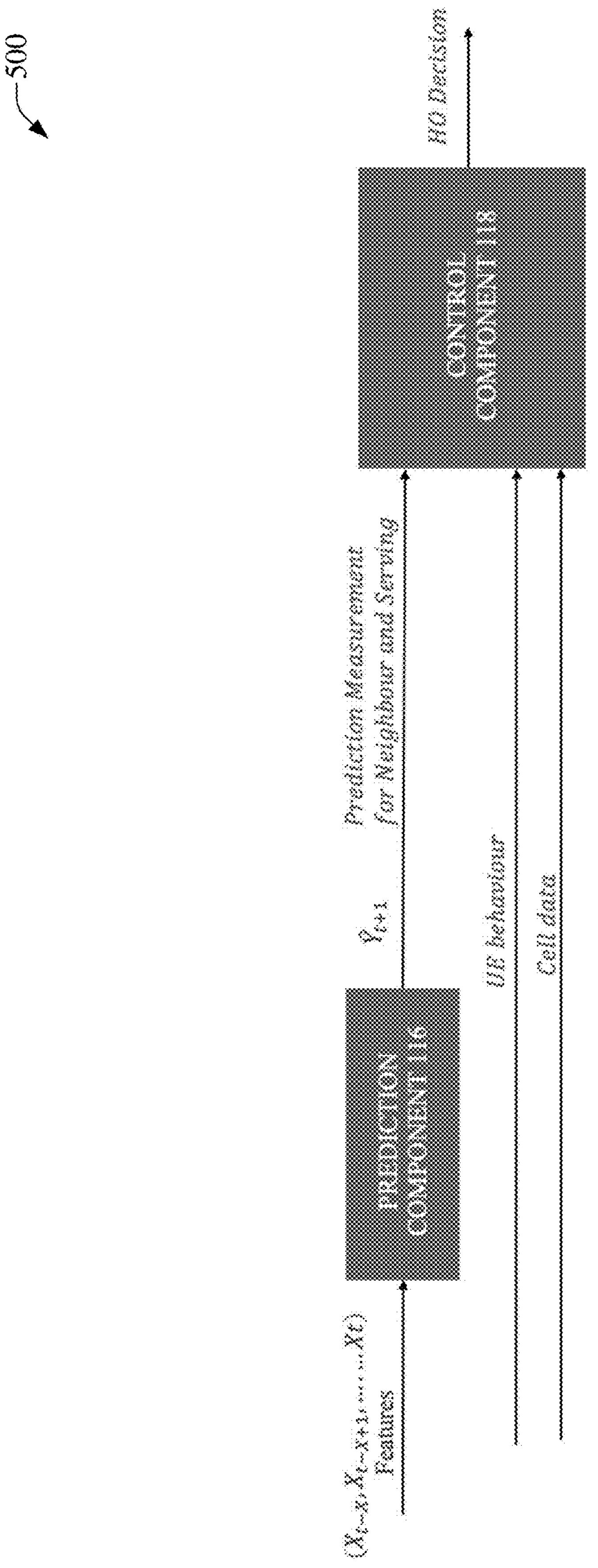
FIG. 5 is a diagram of example control in accordance with one or more example embodiments described herein.

FIG. 5 is a diagram of example control 500 in accordance with one or more example embodiments described herein. In various example embodiments, the control component 118 can operate as an autonomous decision-making engine, leveraging RL models to dynamically make handover decisions, for instance, based on the prediction measurement, UE behavior, cell load, thus ensuring seamless connectivity while maximizing UE quality of service. For instance, in various example embodiments, the control component 118 can enable the following:

Cellular network state determination:
- L1 prediction measurement (RSRP, RSRQ, SINR), which provides insights into the expected performance of serving and neighboring cells, for instance, as received via prediction component 116;
- Cell load, which reflects the current traffic load and resource utilization of the serving cell (e.g., cell 602) and neighboring cell(s), thus influencing handover decisions (e.g., via the control component 118) to alleviate congestion; and
- UE behavior, which includes UE speed, geolocation, and/or direction, thus enabling context-aware handover decisions, for instance, based on UE movement patterns.

Action determination:
- Initiate (e.g., via the control component 118) a handover to a specific neighboring cell, for instance, based on RL output; and
- No action, which maintains the UE's connection to the current serving cell (e.g., cell 602), thus avoiding unnecessary handovers (e.g., if deemed beneficial to remain on the serving cell).

Reward design:
- Handover success, which can comprise a positive reward for successful handovers, thus encouraging the control component 118 (e.g., via RL) to make effective handover decisions that are determined to improve network performance;
- UE performance, which can comprise a reward based on a UE performance metric, such as throughput, latency, and/or reliability, thus ensuring that handover decisions (e.g., via the control component 118) prioritize maintenance a threshold QoS for respective users; and Overall, the reward function incentivizes control component 118 (e.g., via RL) to increase handover success rates while simultaneously enhancing UE performance, thus maintaining a balance between network efficiency and determined user satisfaction.

In various example embodiments, the control component 118 can enable a reinforcement learning reward function, which can reflect the optimization function for the problem, thus encouraging an increase in handover success while maintaining a threshold QoS. A corresponding nonlimiting example reward function can comprise:

$$R(s, a, s') = \alpha \cdot RHandover(s, a, s') + \beta \cdot RThroughput(s, a, s') - \gamma \cdot RLatency(s, a, s') \quad \text{(Equation 2)}$$

where:

R(s,a,s') is the total reward for transitioning from state s to state s' by taking action a;

α,β,γ are weighting coefficients that determine the importance of each reward component;

RHandover(s,a,s') is the reward for the handover action (e.g., it is positive if the handover is successful and negative if the handover fails);

RThroughput(s,a,s') is the reward for throughput improvement (e.g., it is positive if the throughput increases after the handover and zero otherwise); and RLatency(s,a,s') is the reward for latency increase (e.g., it is negative if the latency increases after the handover and zero otherwise).

Figure 6:
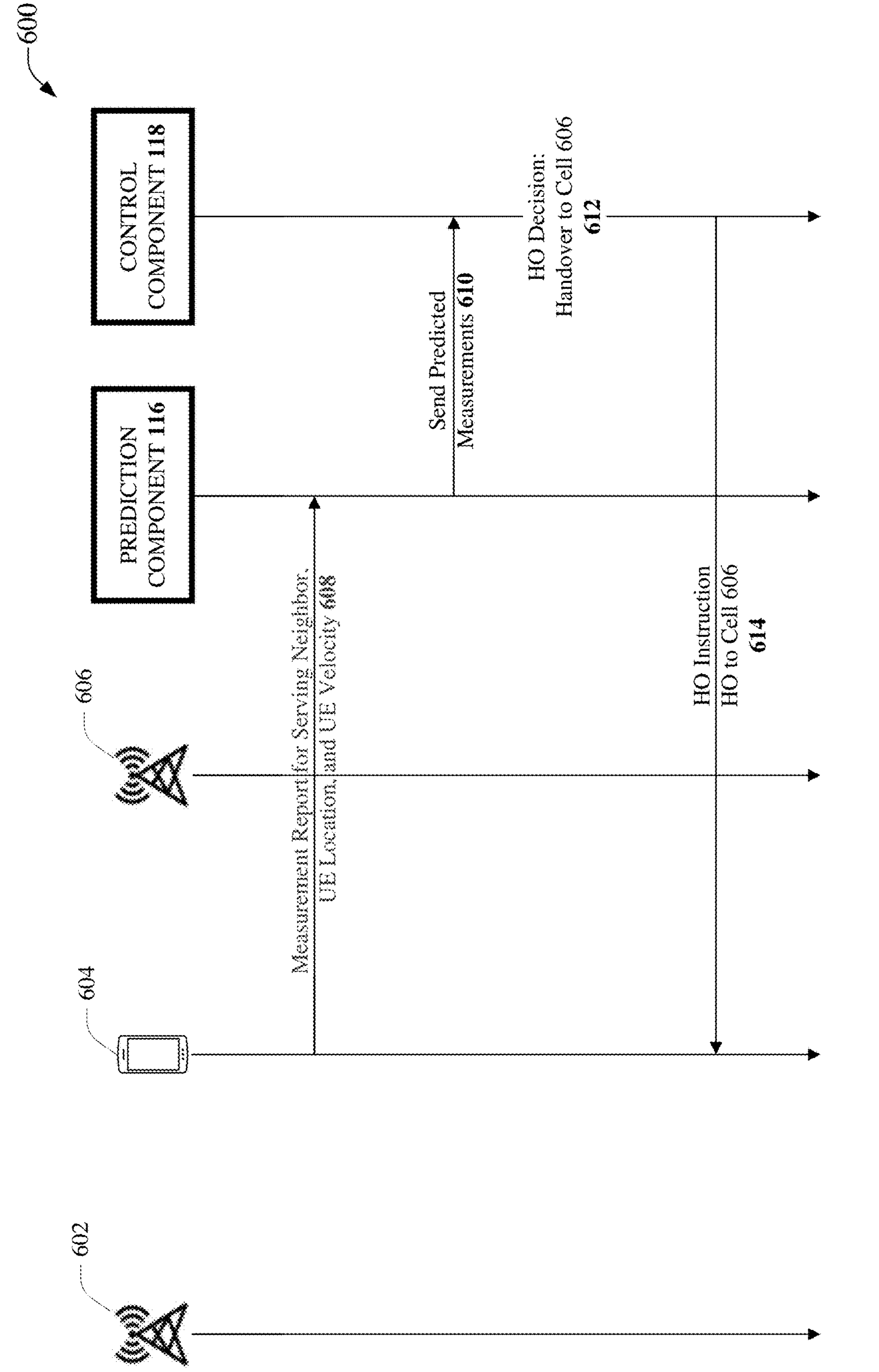
FIG. 6 is a flow chart for an example process associated with intelligent seamless handover in cellular networks in accordance with one or more example embodiments described herein.

FIG. 6 is a flow chart for an example process 600 associated with intelligent seamless handover in cellular networks in accordance with one or more example embodiments described herein. At 608, a UE 604 can send (e.g., to the system 102/to the prediction component 116) a measurement report for the serving cell (e.g., cell 602), the UE 604 location, the UE 604 velocity, and/or the UE 604 direction of travel. Such a measurement report can comprise, for instance, RSSI, RSRP, RSRQ, SINR, or other suitable metrics applicable to the serving cell (e.g., cell 602), in addition to the UE 604 location, the UE 604 velocity, and/or the UE 604 direction of travel. At 610, the prediction component 116 can determine predicted measurements and send the predicted measurements to the control component 118. In this regard, the prediction component 116 can, based on the measurement report and the UE 604 location, the UE 604 velocity, and/or the UE 604 direction of travel, determine (e.g., using a time-series machine learning model (e.g., of the models 122), a predicted connection status for the user equipment (e.g., UE 604). The prediction component 116 can then provide the predicted connection status for the user equipment (e.g., UE 604) to the control component 118. At 612, the control component 118 can make a handover decision (e.g., whether to handover from the serving cell 602 to the neighbor cell 606), for instance, based on the predicted connection status determined via the prediction component 116. At 614, the control component 118 can generate and send a handover instruction to the UE 604, which can comprise an instruction to handover from the cell 602 to the cell 606 (e.g., if the decision by the control component 118 is to handover from the cell 602 to the cell 606). In other embodiments, the control component 118 can determine to maintain a connection between the UE 604 and the serving cell 602 (e.g., rather than initiate a handover to a neighbor cell).

Figure 7:
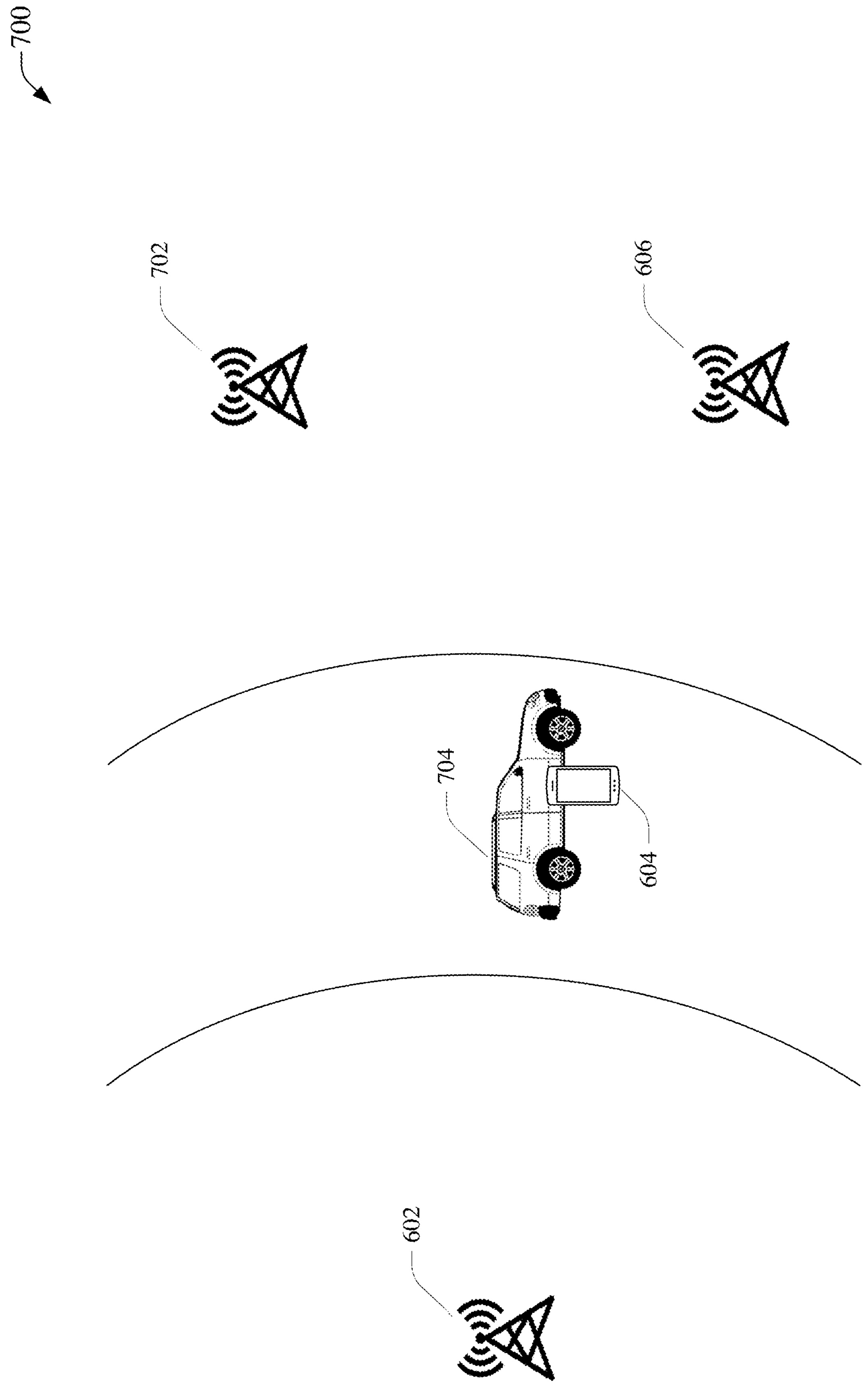
FIG. 7 is a diagram associated with intelligent seamless handover in cellular networks in accordance with one or more example embodiments described herein.

FIG. 7 is a diagram 700 associated with intelligent seamless handover in cellular networks in accordance with one or more example embodiments described herein. In various example embodiments, the UE 604 can be traveling in the vehicle 704, away from the cell 602 (e.g., the serving cell). The system 102) can determine (e.g., via the prediction component 116, control component 118, ML component 120, and/or another suitable component, whether to handover the UE 604 to the cell 606 or to the cell 702 (e.g., neighbor cells), or whether to maintain the UE 604 as connected to a corresponding cellular network via the cell 602.

Figure 8:
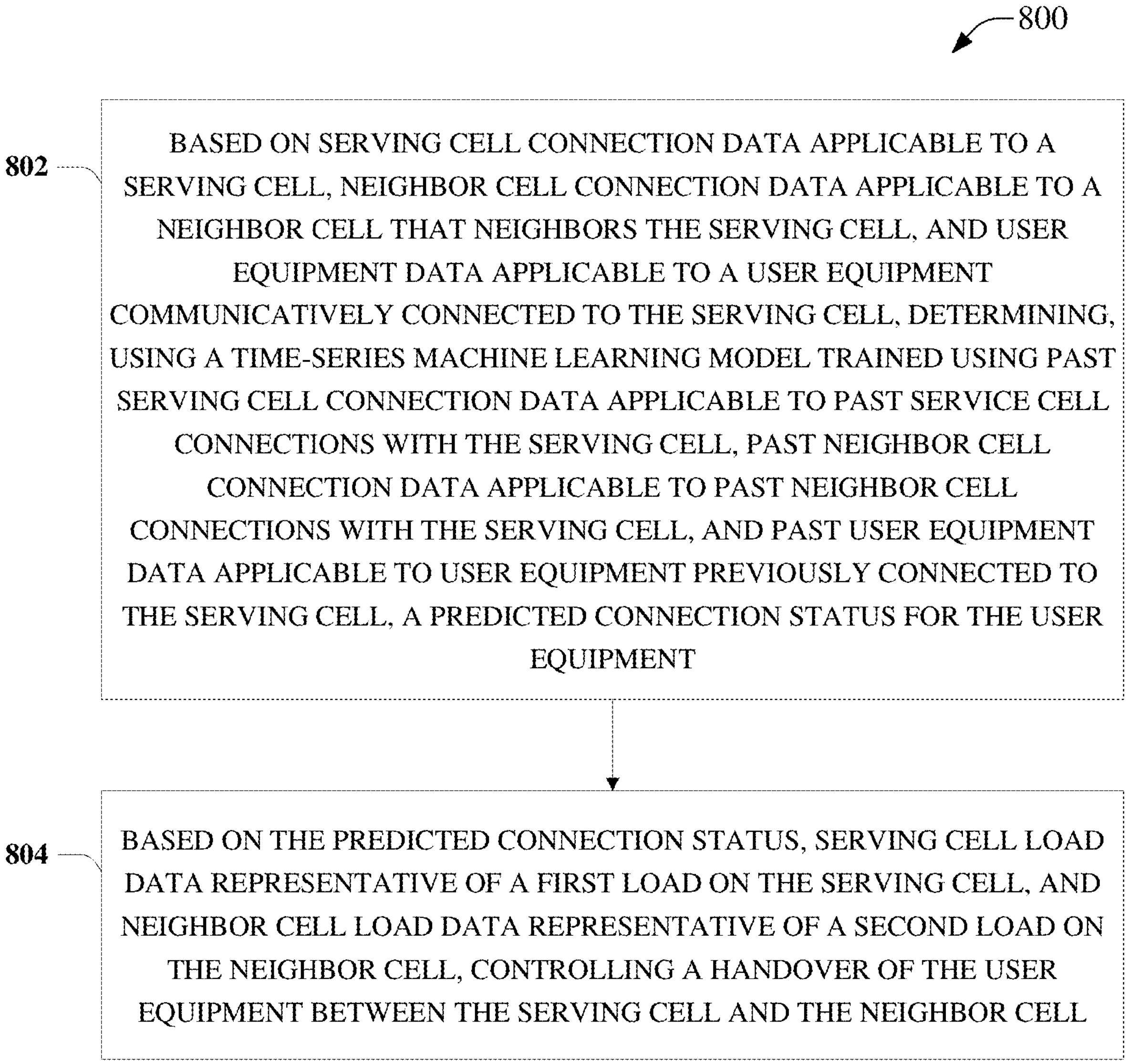
FIG. 8 is a block flow diagram for an example process associated with intelligent seamless handover in cellular networks in accordance with one or more example embodiments described herein.

FIG. 8 is a block flow diagram for an example process 800 associated with intelligent seamless handover in cellular networks in accordance with one or more example embodiments described herein. At 802, the process 800 can comprise, based on serving cell connection data applicable to a serving cell (e.g., cell 602), neighbor cell connection data applicable to a neighbor cell (e.g., cell 606) that neighbors the serving cell (e.g., cell 602), and user equipment data applicable to a user equipment (e.g., UE 604) communicatively connected to the serving cell (e.g., cell 602), determining (e.g., via the prediction component 116), using a time-series machine learning model (e.g., of the models 122) trained (e.g., via the ML component 120) using past serving cell connection data applicable to past service cell connections with the serving cell (e.g., cell 602), past neighbor cell connection data applicable to past neighbor cell connections with the neighbor cell (e.g., cell 606), and past user equipment data applicable to user equipment (e.g., the UE 604 and/or other UE) previously connected to the serving cell (e.g., cell 602), a predicted connection status for the user equipment (e.g., UE 604). At 804, the process 800 can comprise, based on the predicted connection status, serving cell load data representative of a first load on the serving cell (e.g., cell 602), and neighbor cell load data representative of a second load on the neighbor cell (e.g., cell 606), controlling (e.g., via the control component 118) a handover of the user equipment (e.g., UE 604) between the serving cell (e.g., cell 602) and the neighbor cell (e.g., cell 606).

Figure 9:
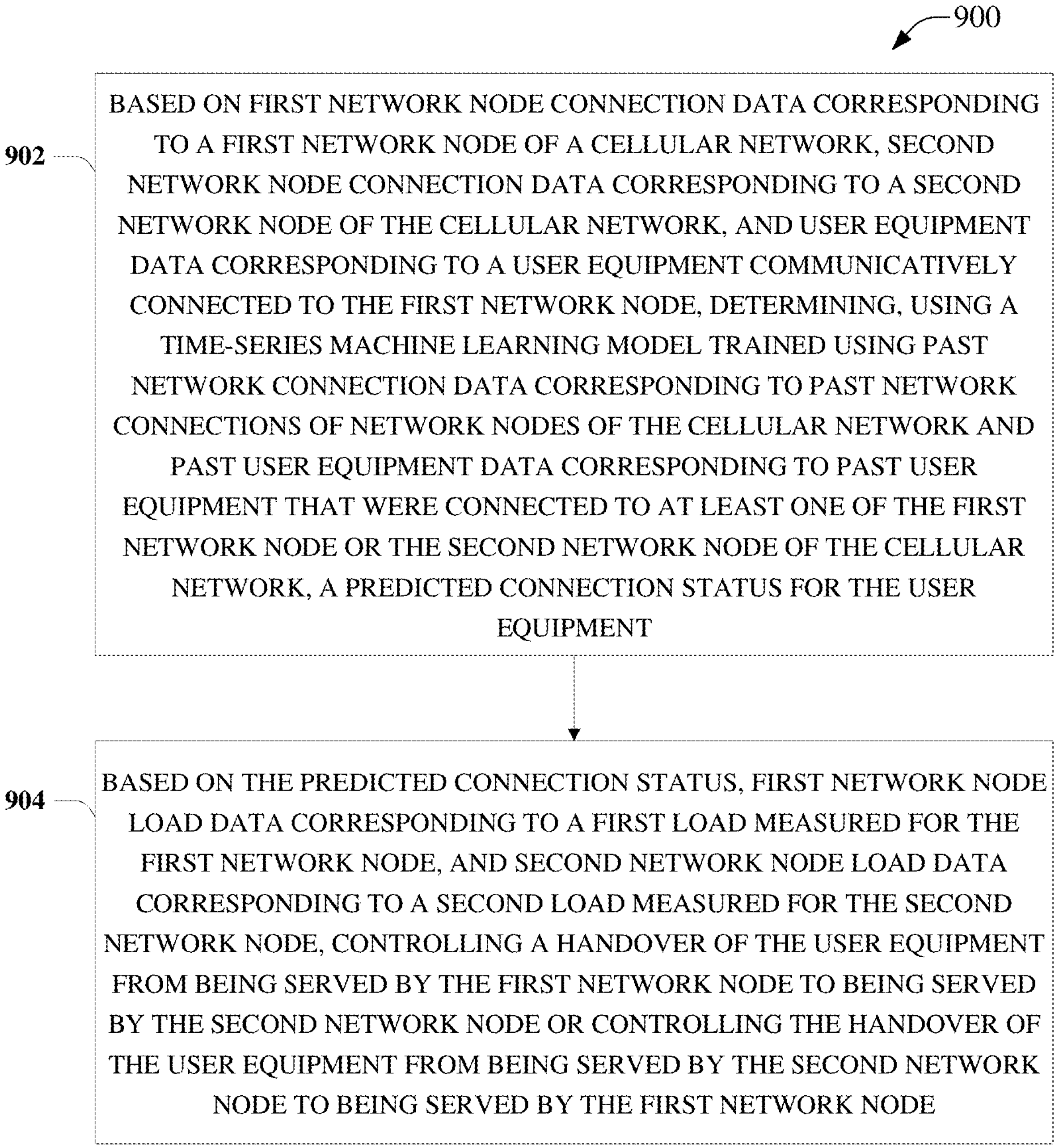
FIG. 9 is a block flow diagram for an example process associated with intelligent seamless handover in cellular networks in accordance with one or more example embodiments described herein.

FIG. 9 is a block flow diagram for an example process 900 associated with intelligent seamless handover in cellular networks in accordance with one or more example embodiments described herein. At 902, the process 900 can comprise, based on first network node connection data corresponding to a first network node (e.g., cell 602) of a cellular network, second network node connection data corresponding to a second network node (e.g., cell 606) of the cellular network, and user equipment data corresponding to a user equipment (e.g., UE 604) communicatively connected to the first network node (e.g., cell 602), determining (e.g., via the prediction component 116), using a time-series machine learning model (e.g., of the models 122) trained (e.g., via the ML component 120) using past network connection data corresponding to past network connections of network nodes (e.g., cell 602, cell 606, cell 702, or other suitable network nodes) of the cellular network and past user equipment data corresponding to past user equipment that were connected to at least one of the first network node (e.g., cell 602) or the second network node (e.g., cell 606) of the cellular network, a predicted connection status for the user equipment (e.g., UE 604). At 904, the process 900 can comprise, based on the predicted connection status, first network node load data corresponding to a first load measured for the first network node (e.g., cell 602), and second network node load data corresponding to a second load measured for the second network node (e.g., cell 606), controlling (e.g., via the control component 118) a handover of the user equipment (e.g., UE 604) from being served by the first network node (e.g., cell 602) to being served by the second network node (e.g., cell 606), or controlling (e.g., via the control component 118) the handover of the user equipment (e.g., UE 604) from being served by the second network node (e.g., cell 606) to being served by the first network node (e.g., cell 602).

Figure 10:
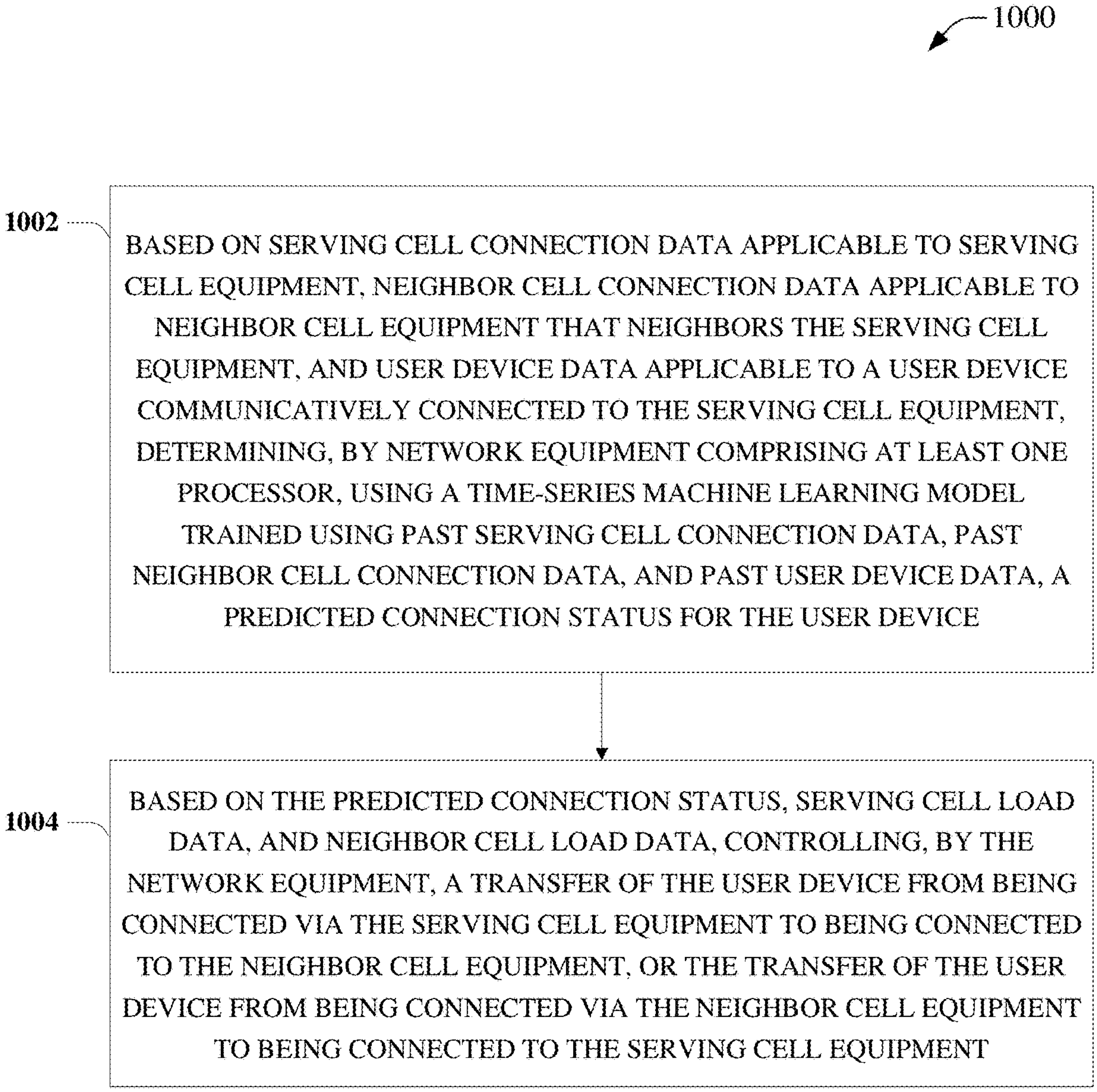
FIG. 10 is a block flow diagram for an example process associated with intelligent seamless handover in cellular networks in accordance with one or more example embodiments described herein.

FIG. 10 is a block flow diagram for an example process 1000 associated with intelligent seamless handover in cellular networks in accordance with one or more example embodiments described herein. At 1002, the process 1000 can comprise, based on serving cell connection data applicable to serving cell equipment (e.g., cell 602), neighbor cell connection data applicable to neighbor cell equipment (e.g., cell 606) that neighbors the serving cell equipment (e.g., cell 602), and user device data applicable to a user device (e.g., UE 604) communicatively connected to the serving cell equipment (e.g., cell 602), determining, by network equipment comprising at least one processor (e.g., via the prediction component 116), using a time-series machine learning model (e.g., of the models 122) trained (e.g., via the ML component 120) using past serving cell connection data, past neighbor cell connection data, and past user device data, a predicted connection status for the user device (e.g., UE 604). At 1004, the process 1000 can comprise, based on the predicted connection status, serving cell load data, and neighbor cell load data, controlling, by the network equipment (e.g., via the control component 118), a transfer of the user device (e.g., UE 604) from being connected via the serving cell equipment (e.g., cell 602) to being connected to the neighbor cell equipment (e.g., cell 606), or the transfer of the user device (e.g., UE 604) from being connected via the neighbor cell equipment (e.g., cell 606) to being connected to the serving cell equipment (e.g., cell 602).

Various example embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 120 can comprise an AI and/or ML model that can be trained (e.g., via supervised and/or unsupervised techniques) to perform the above or below-described functions using historical training data comprising various context conditions that correspond to various augmented network optimization operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the ML component 120. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, a ML component 120 herein can initiate an operation associated with determining various thresholds herein (e.g., a motion pattern thresholds, input pattern thresholds, similarity thresholds, authentication signal thresholds, audio frequency thresholds, or other suitable thresholds).

In an example embodiment, the ML component 120 can perform a utility-based analysis that factors cost of initiating the above-described operations versus benefit. In this embodiment, the ML component 120 can use one or more additional context conditions to determine various thresholds herein.

To facilitate the above-described functions, a ML component 120 herein can perform classifications, correlations, inferences, and/or expressions associated with principles of artificial intelligence. For instance, the ML component 120 can employ an automatic classification system and/or an automatic classification. In one example, the ML component 120 can employ a probabilistic and/or statistical-based analysis (e.g., factoring into the analysis utilities and costs) to learn and/or generate inferences. The ML component 120 can employ any suitable machine-learning based techniques, statistical-based techniques, and/or probabilistic-based techniques. For example, the ML component 120 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 120 can perform a set of machine-learning computations. For instance, the ML component 120 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 11:
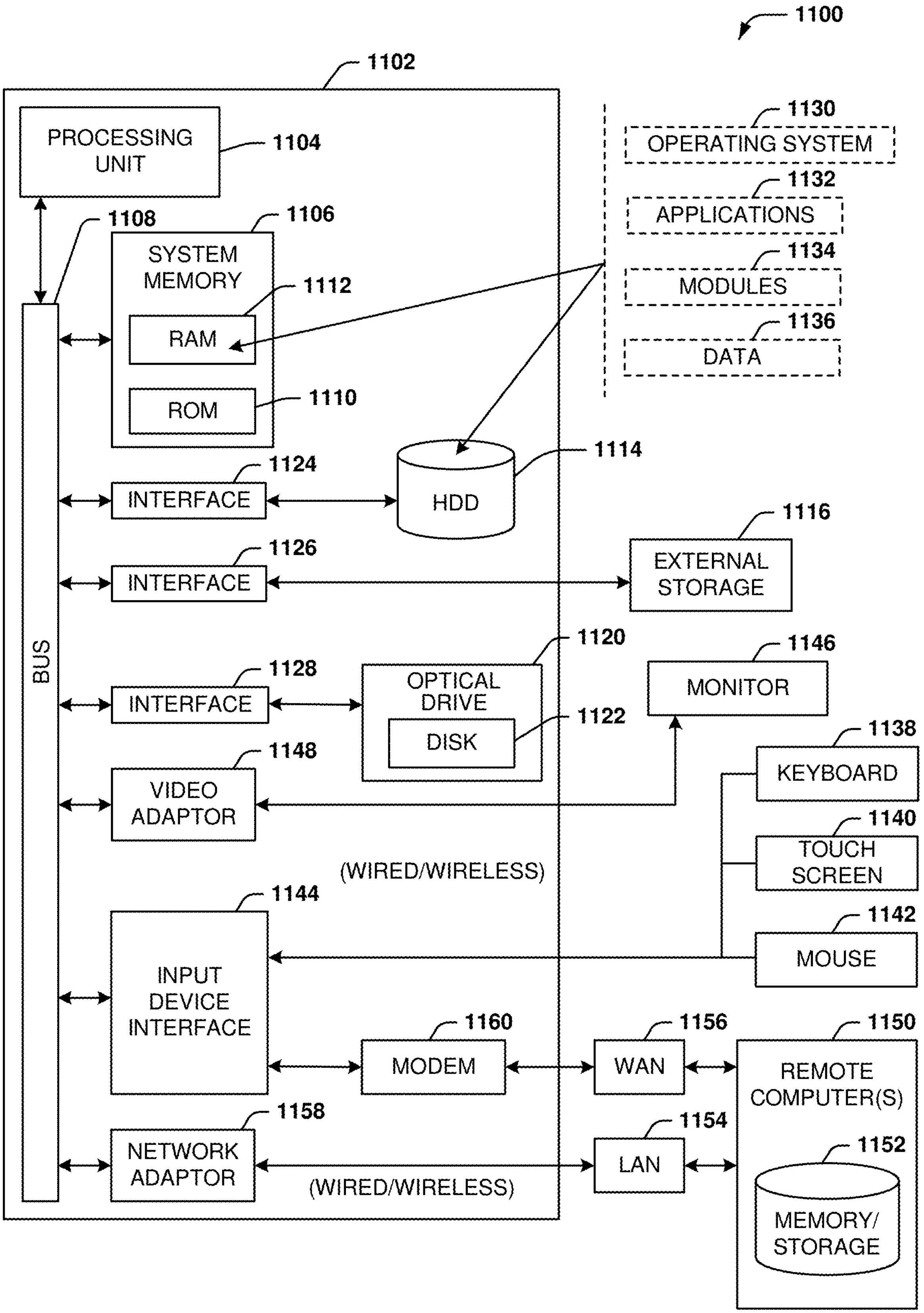
FIG. 11 is an example, non-limiting computing environment in which one or more example embodiments described herein can be implemented.

In order to provide additional context for various example embodiments described herein, FIG. 11 and the following discussion are intended to provide a brief, general description of a suitable computing environment 1100 in which the various example embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 11, the example environment 1100 for implementing various example embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive, a memory stick or flash drive reader, a memory card reader, etc.) and an optical disk drive 1120 (e.g., which can read or write from a disk 1122 such as CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can also be connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
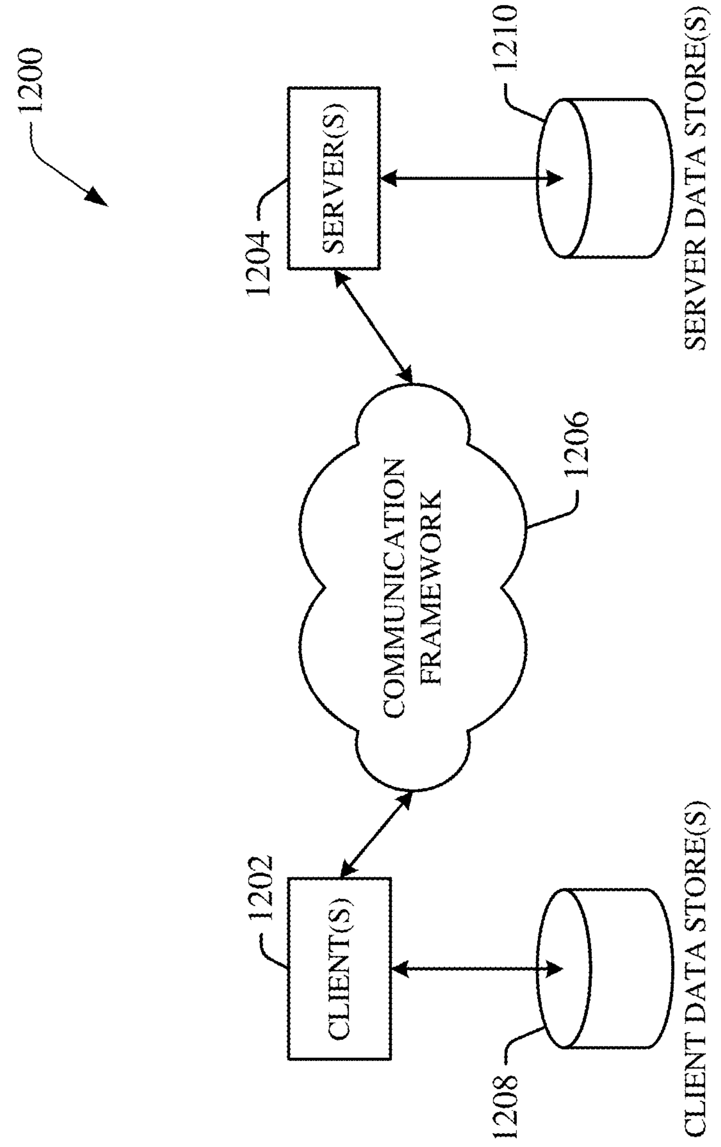
FIG. 12 is an example, non-limiting networking environment in which one or more example embodiments described herein can be implemented.

Referring now to FIG. 12, there is illustrated a schematic block diagram of a computing environment 1200 in accordance with this specification. The system 1200 includes one or more client(s) 1202, (e.g., computers, smart phones, tablets, cameras, PDA's). The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware or hardware in combination with software (e.g., threads, processes, computing devices). The servers 1204 can house threads to perform transformations of media items by employing aspects of this disclosure, for example. One possible communication between a client 1202 and a server 1204 can be in the form of a data packet adapted to be transmitted between two or more computer processes wherein data packets may include coded analyzed headspaces and/or input. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

In one exemplary embodiment, a client 1202 can transfer an encoded file, (e.g., encoded media item), to server 1204. Server 1204 can store the file, decode the file, or transmit the file to another client 1202. It is noted that a client 1202 can also transfer an uncompressed file to a server 1204 and server 1204 can compress the file and/or transform the file in accordance with this disclosure. Likewise, server 1204 can encode information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various example embodiments. It is, of course, not possible to describe every conceivable combination of components, modules, or methods for purposes of describing the disclosed subject matter, and one skilled in the art may recognize that further combinations and permutations of the various example embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various example embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

based on serving cell connection data applicable to a serving cell, neighbor cell connection data applicable to a neighbor cell that neighbors the serving cell, and user equipment data applicable to a user equipment communicatively connected to the serving cell, determining, using a time-series machine learning model trained using past serving cell connection data applicable to past service cell connections with the serving cell, past neighbor cell connection data applicable to past neighbor cell connections with the neighbor cell, and past user equipment data applicable to user equipment previously connected to the serving cell, a predicted connection status for the user equipment; and based on the predicted connection status, serving cell load data representative of a first load on the serving cell, and neighbor cell load data representative of a second load on the neighbor cell, controlling a handover of the user equipment between the serving cell and the neighbor cell, wherein the user equipment data comprises a velocity of the user equipment, a direction of travel of the user equipment, and a location of the user equipment.

2. The system of claim 1, wherein the controlling of the handover comprises facilitating the handover from the serving cell to the neighbor cell.

3. The system of claim 1, wherein the controlling of the handover comprises retaining a communicative connection between the serving cell and the user equipment.

4. The system of claim 1, wherein the serving cell connection data comprises at least one of: a received signal strength indicator applicable to the serving cell, a signal received power applicable to the serving cell, a signal received quality applicable to the serving cell, or a signal to interference plus noise ratio applicable to the serving cell.

5. The system of claim 1, wherein the neighbor cell connection data comprises at least one of: a first reference signal received power applicable to the neighbor cell or a second reference signal received quality applicable to the neighbor cell.

6. The system of claim 1, wherein the controlling of the handover of the user equipment between the serving cell and the neighbor cell is determined to result in satisfying a function with respect to a quality-of-service metric applicable to the user equipment, and wherein the quality-of-service metric comprises at least one of a throughput metric corresponding to a throughput applicable to the user equipment, a latency metric corresponding to a latency applicable to the user equipment, or a connection drop status metric corresponding to a connection drop status applicable to the user equipment.

7. The system of claim 1, wherein the controlling of the handover of the user equipment between the serving cell and the neighbor cell is determined to result in maximizing a quality-of-service metric applicable to the user equipment.

8. The system of claim 1, wherein the time-series machine learning model comprises a long short-term memory model.

9. The system of claim 1, wherein the controlling of the handover of the user equipment between the serving cell and the neighbor cell is performed using a machine learning model trained based on reinforcement learning.

10. The system of claim 9, wherein the reinforcement learning comprises utilization of weighting coefficients applicable to at least one of a handover action associated with the user equipment, a throughput associated with the user equipment, or a latency associated with the user equipment.

11. A non-transitory machine-readable medium, comprising executable instructions that, when executed by at least one processor, facilitate performance of operations, comprising:

based on first network node connection data corresponding to a first network node of a cellular network, second network node connection data corresponding to a second network node of the cellular network, and user equipment data corresponding to a user equipment communicatively connected to the first network node, determining, using a time-series machine learning model trained using past network connection data corresponding to past network connections of network nodes of the cellular network and past user equipment data corresponding to past user equipment that were connected to at least one of the first network node or the second network node of the cellular network, a predicted connection status for the user equipment; and based on the predicted connection status, first network node load data corresponding to a first load measured for the first network node, and second network node load data corresponding to a second load measured for the second network node, controlling a handover of the user equipment from being served by the first network node to being served by the second network node or controlling the handover of the user equipment from being served by the second network node to being served by the first network node, wherein the user equipment data comprises a velocity of the user equipment, a direction of travel of the user equipment, and a location of the user equipment.

12. The non-transitory machine-readable medium of claim 11, wherein the determining of the predicted connection status for the user equipment is further based on third network node connection data corresponding to a third network node of the cellular network, and wherein the controlling of the handover of the user equipment is further controlled, based on third network node load data, between the first network node, the second network node, and the third network node.

13. The non-transitory machine-readable medium of claim 11, wherein the user equipment data comprises at least one of: a velocity of the user equipment, a direction of travel of the user equipment, or a location of the user equipment.

14. The non-transitory machine-readable medium of claim 11, wherein the first network node connection data comprises at least one of: a received signal strength indicator corresponding to the first network node, a signal received power corresponding to the first network node, a signal received quality corresponding to the first network node, or a signal to interference plus noise ratio corresponding to the first network node.

15. The non-transitory machine-readable medium of claim 11, wherein the second network node connection data comprises at least one of: a first reference signal received power corresponding to the second network node or a second reference signal received quality corresponding to the second network node.

16. A method, comprising:

based on serving cell connection data applicable to serving cell equipment, neighbor cell connection data applicable to neighbor cell equipment that neighbors the serving cell equipment, and user device data applicable to a user device communicatively connected to the serving cell equipment, determining, by network equipment comprising at least one processor, using a time-series machine learning model trained using past serving cell connection data, past neighbor cell connection data, and past user device data, a predicted connection status for the user device; and based on the predicted connection status, serving cell load data, and neighbor cell load data, controlling, by the network equipment, a transfer of the user device from being connected via the serving cell equipment to being connected to the neighbor cell equipment, or the transfer of the user device from being connected via the neighbor cell equipment to being connected to the serving cell equipment, wherein the user device data comprises a velocity of the user device, a direction of travel of the user device, and a location of the user device.

17. The method of claim 16, wherein the controlling of the transfer of the user device between the serving cell equipment and the neighbor cell equipment is determined to maximize a quality-of-service metric applicable to the user device.

18. The method of claim 16, wherein the controlling of the transfer of the user device between the serving cell equipment and the neighbor cell equipment is determined to satisfy a defined function with respect to a quality-of-service metric applicable to the user device, and wherein the quality-of-service metric comprises a throughput metric corresponding to a throughput applicable to the user device, a latency metric corresponding to a latency applicable to the user device, or a connection drop status metric corresponding to a connection drop status applicable to the user device.

19. The method of claim 16, wherein the controlling of the transfer of the user device between the serving cell equipment and the neighbor cell equipment is performed using an output from a reinforcement learning process.

20. The method of claim 16, wherein the controlling of the transfer comprises:

facilitating the transfer from the serving cell equipment to the neighbor cell equipment, or retaining a communicative connection between the serving cell equipment and the user device.

* * * * *